May 24, 1927.
F. W. HOCHSTETTER ET AL
1,629,869
SOUND RECEIVER AND TRANSMITTER
Filed March 26, 1923
2 Sheets-Sheet 1
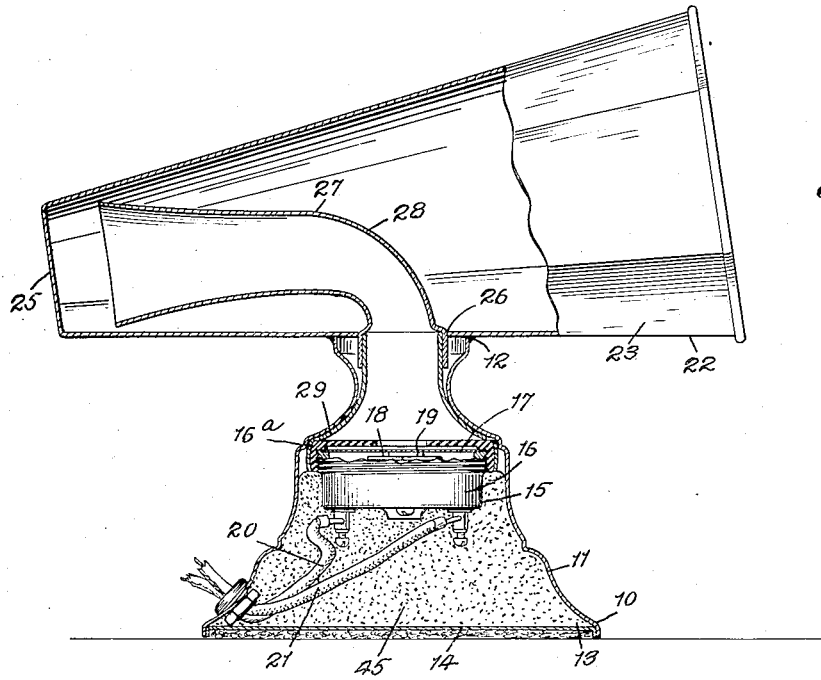
Fig. 1,
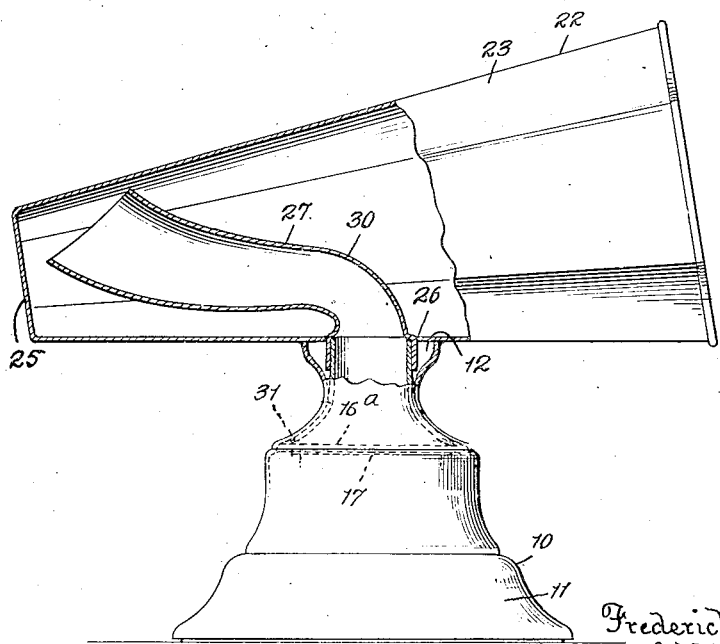
Fig. 2,
INVENTORS
Frederick W. Hochstetter
and Walter W. Thorpe
BY W. T. Criswell.
ATTORNEY

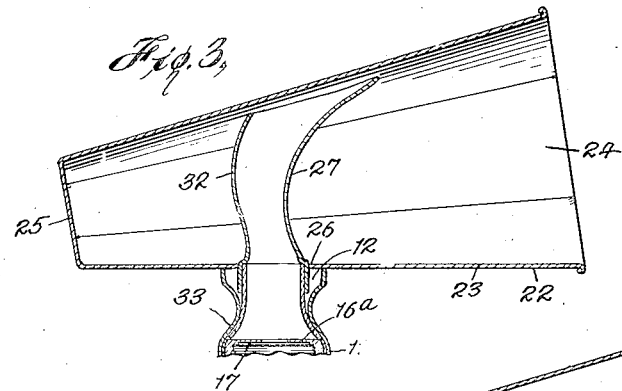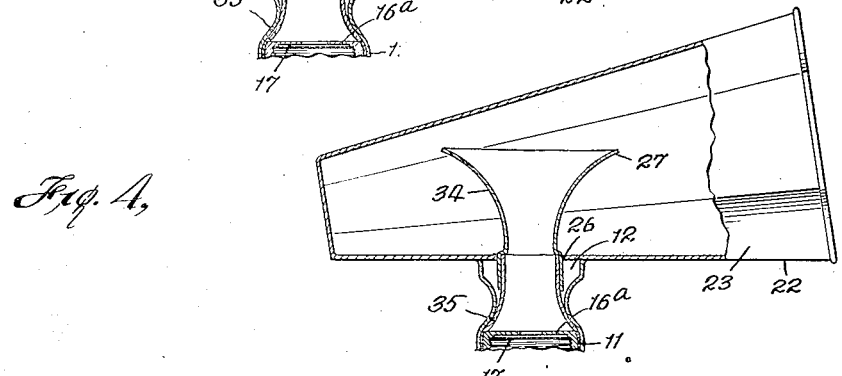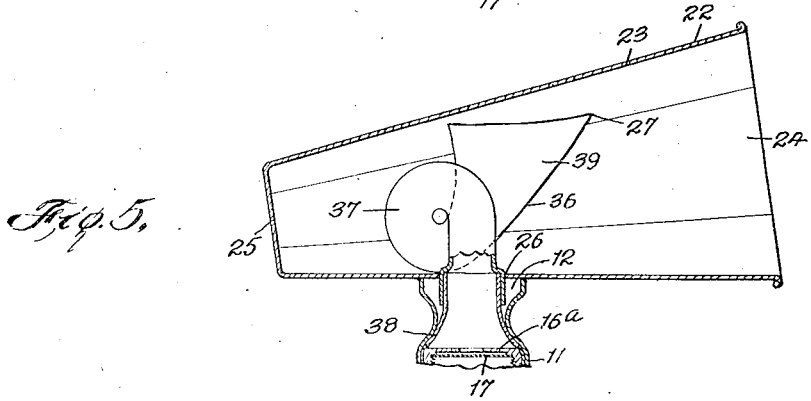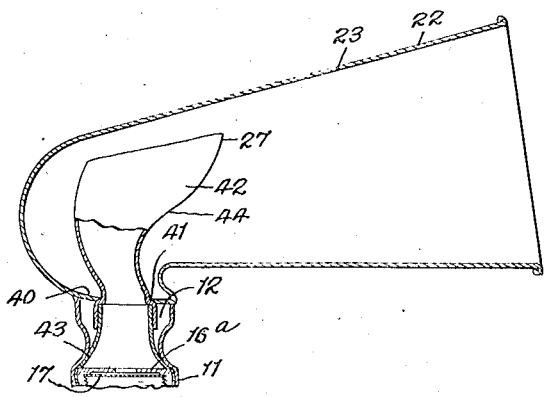

Patented May 24, 1927.

1,629,869

UNITED STATES PATENT OFFICE.

FREDERICK W. HOCHSTETTER, OF DAYTON, OHIO, AND WALTER W. THORPE, OF NEW YORK, N. Y.

SOUND RECEIVER AND TRANSMITTER.

Application filed March 26, 1923. Serial No. 627,760.

This invention relates to a class of devices adapted to be used for amplifying the sound waves transmitted by radio-electric systems, phonographs and the like.

Our invention has for its object primarily to provide a receiver and transmitter designed to be employed with a radio-electric system or in conjunction with a phonograph apparatus for receiving sound impulses and for projecting the sound waves in magnified volumes so that the subject matter will be distinctly heard by the persons within the area of the field of the directed sound waves, in order to overcome the requirement for each individual to use a separate receiver, especially when the device is employed in a wireless electric system. It is also contemplated to provide the device of a form adapted to be arranged at a distance from the sound wave transmitting apparatus as well as being adapted to be disposed in various positions to accommodate the listeners of the subject matter projected. The invention includes mainly the provision of a sound transmitter having an outer amplifier and an inner conveyer for receiving sound wave impulses, and the conveyer is disposed so that the sound waves received will be transmitted to the interior of the amplifier and deflected for successively magnifying in sound volume during the course of the wave impulses to final discharge from the amplifier whereby persons within the area of projection will clearly hear the subject matter of the sound waves.

A further object of the invention is to provide a sound receiver and transmitter of a simple and efficient construction adapted to be made of suitable material in any appropriate size and shape.

With these and other objects in view, the invention will be hereinafter more fully explained with reference to the accompanying drawings forming a part of this specification in which similar characters of reference indicate corresponding parts in all the views, and will then be pointed out in the claims at the end of the description.

In the drawings, Figure 1 is a sectional view, partly in elevation, taken longitudinally through one form of sound receiver and transmitter embodying my invention.

Fig. 2 is an elevation, partly broken away, of a slightly different form of the device.

Fig. 3 is a fragmentary view showing a reduced section taken through another form of the device.

Fig. 4 is a fragmentary view showing a reduced section, partly in elevation, taken through another slightly modified form of the device.

Fig. 5 is a fragmentary view showing a reduced section, partly in elevation, of still another modified form of the device, and Fig. 6 is a fragmentary view showing a reduced section, partly in elevation, of another modified form of the device.

The device has a base 10 which may be made of metal or other suitable material in any desired shape, though the base illustrated is hollow and has a circular wall 11 which is tapered upwardly in somewhat a cone-shape. In the apex of the wall is an opening 12, and the lower end of the wall may be open, as at 13, in which is held a removable bottom plate 14. Within the upper part of the base 10 is a sound receiver 15 of a form commonly used in telephones and other sound transmitting apparatus, having a cap-shaped box or casing 16 disposed so that its mouth or entrance is in closely spaced relation to the opening 12 of the base 10. On the free edge of the wall of the casing 16 is an orificed removable cover 16ª and under this cover also over the entrance of the casing is an electro-magnetic conductive diaphragm 17 adapted to receive and resonate sound wave impulses by being vibrated in the well known manner with the energizing of the magnets, as 18, 19, which are provided in the casing and which when the device is used in a wireless system are energized by electric impulses through the medium of conductive wires, as 20, 21, which may lead from the source of sound production. The wires 20, 21, may be of lengths for allowing the base 10 to be disposed in any desired position at a distance from the wireless apparatus proper.

On the upper open end 12 of the wall 11 of the base 10 is a sound amplifier 22 which is preferably of the form of a horn having a tapered annular wall 23 of a suitable length, and the large end of this wall is open, as at 24, for serving as a discharge outlet whereby sound waves will be projected into the area of the field fronting the outlet when the device is in use. The other ends of the walls 23 of the forms of the amplifier, shown in Figs. 1, 2, 3, 4, 5, are closed, as at 25. The central part of the wall of each of these amplifiers is mounted on the base 10, and in the wall of each amplifier is an opening 26 leading into the opening 12 of the base to provide communication between the interior of the amplifier and the part of the interior of the base above the casing of the vibratory diaphragm 17 of the sound receiver 15.

In each of the sound amplifiers 22 is a conveyer 27 serving to receive the sound wave impulses from the resonator or diaphragm 17 when vibrated by the energizing of the magnet 18, 19 of the receiver 15 as well as serving to transmit the sound waves to the interior of the amplifier. The form of the conveyer 27, shown in Fig. 1, is of a tubular shape having a tapered or horn-shaped annular wall 28. The reduced end portion of the wall 28 extends through the openings 26 of the amplifier 22 and through the opening 12 of the base 10, and the end part of the wall of the conveyer within the base is flared, as at 29. This flared end of the wall 28 is of a size approximately similar to the diameter of the vibratory diaphragm 17 of the receiver 15, and the flared end of the wall is also adjacent the orificed cover 16ª of the casing 16 of the receiver so that the sound waves distributed by the diaphragm will be received in the conveyer. The portion of the wall of the tubular conveyer within the transmitter is preferably curved gradually toward its large open end as well as being curved in a direction so that the large open end terminates in spaced proximity to the closed end 25 of the amplifier 22, in order to provide an uninterrupted passage for transmission of the sound waves through the conveyer. By this form of the conveyer 27 the sound waves received from the resonating diaphragm 17 will travel through the orificed cover 16ª of the casing 16 and through the conveyer for projection against the closed end 25 of the amplifier, and in turn the sound waves will be deflected by the wall of the amplifier for being magnified in sound volume during their course to final discharge from the open end 24 of the amplifier.

In Fig. 2 is shown a form of the conveyer 27 having a tubular annular wall 30 of a tapered or horn-shape, and the reduced end portion of the wall extends through the opening 26 of the amplifier and through the opening 12 of the case 10. The end part of the wall projecting into the base is flared, as at 31, to a size substantially similar to the diameter of the orificed cover 16ª of the casing 16 of the receiver, and this flared end also terminates against the cover 16ª in proximity to the diaphragm so that the sound waves resonated by the diaphragm will pass through the cover into the conveyer. The part of the wall 30 of the conveyer within the amplifier is curved in somewhat a sinuous shape so that its large open end is in spaced opposed relation to part of the annular wall of the amplifier in proximity to its closed end. The sound waves received in the conveyer will thereby be transmitted for being projected tangentially against the wall of the amplifier, and in turn the waves will be diffused through the area of the interior of the amplifier so that the waves will magnify in sound volume during their passage from the amplifier.

The form of the conveyer 27 shown in Fig. 3 is also tubular having an annular wall 32 of a tapered or horn-shape, and the reduced end of this wall extends through the opening 26 of the amplifier 22 as well as extending through the opening 12 of the base. The reduced end of the wall 32 is flared, as at 33, to a diameter so that it embraces the top of the orificed cover 16ª of the casing 16 of the receiver 15, and the other portion of the wall is curved so that its large open end may terminate in spaced close relation to the central part of the upper portion of the wall 32 of the conveyer. In this form of the device the sound waves will pass from the diaphragm 17 through the orificed cover 16ª of the casing of the receiver 15 and through the conveyer for being also tangentially deflected by the wall of the amplifier, in order to cause magnifying in volume of the sound waves during their passage to projection from the amplifier.

In Fig. 4 is illustrated a form of the conveyer having a tubular wall, as 34, of substantially a funnel-shape, and the reduced end of this wall extends through the opening 26 of the amplifier 22 into the upper part of the base 10. The reduced end of the wall 34 is also preferably flared outwardly, as at 35, to a size approximately similar to the diameter of the orificed cover 16ª of the casing 16 of the receiver 15, and this flared end terminates adjacent the orificed cover. The upper funnel-shaped portion of the wall 34 is disposed vertically upward in the amplifier 22 so that its flared upper open end terminates approximately in the center of the interior of the amplifier so that the sound waves from the diaphragm 17 when vibrated will travel through the conveyer in magnifying sound volume for being diffused by the wall of the amplifier in enlarged magnified sound volume during the flow of the waves within and from the amplifier.

In Fig. 5 is shown a form of the conveyer 27 having a tubular wall 36 with its central part being bent to provide a loop, as 37, of a circular shape, and the reduced end part of the wall below the loop extends through the opening 26 of the amplifier 22 into the base 10. The reduced end of the wall 26 within the base is flared, at 38 to a diameter similar to the diameter of the orificed cover 16ª of the casing 16 of the receiver 15, and this flared end also rests upon the cover. The portion of the tubular wall above the loop 37 is flared in somewhat a funnel shape, as at 39, and this funnel-shaped portion extends upward within the amplifier to spaced proximity to the central part of the tubular wall 36 so that the sound waves from the diaphragm when vibrated will pass in a continuous circuitous course through the conveyer for being deflected by the wall of the amplifier to cause the sound volume of the waves to be magnified when projected from the amplifier.

The amplifier 22 of the form of the device illustrated in Fig. 6 has the reduced end of its wall 23 arcuated downwardly, as at 40, and in this arcuate end is an opening 41. This form of the amplifier is also supported on the base 10 by the part of the curved reduced end of the wall surrounding the opening being mounted on the open upper end of the base so that the opening 41 leads into the base. The sound wave conveyer 27 of this form of the device has a tubular wall 42 of a tapered or horn-shape, and the reduced end of this wall extends into the base 10 through the opening 40 of the wall of the amplifier. The part of the reduced end of the wall of the conveyer within the base terminates with a flared end, as 43, which abuts against the orificed cover 16ª of the casing 16, and this flared end may be of a size embracing the top of the cover. The portion of the tubular wall 42 within the amplifier may be curved, as at 44, as well as being disposed upwardly whereby the large open end of the conveyer is in spaced relation to the upper part of the rear end portion of the wall 23 of the amplifier. The sound waves from the diaphragm when vibrated will be transmitted through the conveyer to the interior of the amplifier, and the waves will then be tangentially deflected by the wall of the amplifier so that the sound volume of the waves will be amplified, during the course thereof to final discharge from the amplifier. In order to prevent all tendency of the sound waves from being reverberated by the base, on the interior of the base below the receiver 15 may be a muffler, as 45, such as a filler of salt, cementitious material, lead or other material adapted to deaden sound waves.

In the foregoing description, we have embodied the preferred form of our invention, but we do not wish to be understood as limiting ourselves thereto, as we are aware that modifications may be made therein without departing from the principle or sacrificing any of the advantages of this invention, therefore, we reserve to ourselves the right to make such changes as fairly fall within the scope thereof.

Having thus described our invention, we claim as new and desire to secure by Letters Patent:

1. In a sound receiver and transmitter, the combination with a base having an outlet for supporting an amplifying horn, of a casing in the base, carrying a resonating diaphragm, and sound muffling material in the base with said casing embedded therein.

2. In a sound receiver and transmitter, the combination with a base having an outlet for supporting an amplifying horn, of a casing in the base, carrying a resonating diaphragm, and a tubular sound conveyer leading from the casing over the diaphragm through the outlet of the base for being disposed in the amplifying horn.

3. In a sound receiver and transmitter, the combination with a base having an outlet for supporting an amplifying horn, of a casing in the base, carrying a resonating diaphragm, sound muffling material in the base with said casing embedded therein, and a tubular sound conveyer leading from the casing over the diaphragm through the outlet of the base for being disposed in the amplifying horn.

This specification signed and witnessed this 24 day of March, A. D. 1923.

FREDERICK W. HOCHSTETTER.
WALTER W. THORPE.